(12) United States Patent
Chen (10) Patent No.: US 9,632,279 B2
(45) Date of Patent: Apr. 25, 2017

(54) VOICE COIL MOTOR ARRAY MODULE

(71) Applicants: LITE-ON ELECTRONICS (GUANGZHOU) LIMITED, Guangzhou (CN); LITE-ON TECHNOLOGY CORP., Taipei (TW)

(72) Inventor: Hsing-Hung Chen, Yilan County (TW)

(73) Assignees: Lite-On Electronics (Guangzhou) Limited, Guangzhou (CN); Lite-on Technology Corp., Taipei (TW)

( * ) Notice: Subject to any disclaimer, the term of this patent is extended or adjusted under 35 U.S.C. 154(b) by 19 days.

(21) Appl. No.: 14/623,865

(22) Filed: Feb. 17, 2015

(65) Prior Publication Data

US 2015/0316744 A1 Nov. 5, 2015

(30) Foreign Application Priority Data

Apr. 30, 2014 (CN) .......................... 2014 1 0181864

(51) Int. Cl.
| | |
|---|---|
| G02B 7/04 | (2006.01) |
| H04N 5/225 | (2006.01) |
| G02B 7/08 | (2006.01) |
| H04N 5/247 | (2006.01) |
| H02K 41/035 | (2006.01) |
| G02B 3/00 | (2006.01) |

(52) U.S. Cl.
CPC .............. *G02B 7/04* (2013.01); *G02B 7/08* (2013.01); *H02K 41/0356* (2013.01); *H04N 5/225* (2013.01); *H04N 5/2254* (2013.01); *H04N 5/247* (2013.01); *G02B 3/0006* (2013.01)

(58) Field of Classification Search
CPC ....................................................... H04N 5/2254
USPC ................................ 359/811, 813, 814, 824
See application file for complete search history.

(56) References Cited

U.S. PATENT DOCUMENTS

| | | | | |
|---|---|---|---|---|
| 2010/0314953 A1* | 12/2010 | Gan | ................... | H02K 41/0354 310/12.16 |
| 2011/0044679 A1* | 2/2011 | Yoshida | ................... | G02B 7/08 396/133 |
| 2013/0242181 A1* | 9/2013 | Phoon | ...................... | G02B 7/04 348/374 |
| 2015/0316745 A1* | 11/2015 | Chen | .................... | H02K 41/035 359/824 |

FOREIGN PATENT DOCUMENTS

TW  DE 202006013377 U1 * 11/2006  ............... G02B 7/02

* cited by examiner

*Primary Examiner* — Darryl J Collins
*Assistant Examiner* — Journey Sumlar
(74) *Attorney, Agent, or Firm* — Rosenberg, Klein & Lee (57) ABSTRACT

A voice coil motor array module includes a carrier frame defining a plurality of receiving spaces and a plurality of magnet-mounting spaces disposed in pairs and in symmetry around the receiving spaces. Any two adjacent receiving spaces have only one magnet-mounting space therebetween. A plurality of magnetic components are respectively disposed in the magnet-mounting spaces. Each magnet-mounting space receives only one magnetic component. The magnetic components surrounding a corresponding receiving space have same magnetic poles facing each other. A plurality of displacement components are respectively disposed in the receiving spaces. Each displacement component includes a lens carrier and a coil.

11 Claims, 9 Drawing Sheets

VOICE COIL MOTOR ARRAY MODULE

CROSS REFERENCE TO RELATED APPLICATION

This application claims priority of Chinese Patent Application Number 201410181864.8, filed on Apr. 30, 2014.

FIELD OF THE INVENTION

The invention relates to a motor, more particularly to a voice coil motor array module.

BACKGROUND OF THE INVENTION

Use of a voice coil motor (VCM) for driving a camera lens to a focusing position has been widely applied to mobile devices, such as smart phones, tablet computers, etc. As the technology advances, the use of multiple cameras to shoot and obtain a plurality of images, and then restructuring the images to obtain a fused image with a higher resolution or lower noise, has gradually become a new trend. Therefore, the design of a voice coil motor array module equipped with many lenses also appears to be increasingly important.

A conventional voice coil motor requires a plurality of magnetic components disposed around a lens carrier having a coil, so that when the coil is energized and interacts with a magnetic field of the magnetic components, an action force is generated. Furthermore, by controlling the current direction to generate an upward or downward action force, the lens carrier is driven to move the lens to a focusing position.

When the conventional voice coil motor is developed into a voice coil motor array module, because of the effect of magnetic attraction or repulsion between the magnetic components, an attractive or repulsive force may be generated between adjacent voice coil motors, so that during the manufacturing process, each voice coil motor is prone to deviate from a predetermined assembly position, thereby generating an error. This leads to deterioration of the quality of the fused image. Furthermore, interaction between the magnetic components may also influence the magnetic field and affect the action force generated by the current and the magnetic field, thereby leading to poor focus.

Thus, the conventional voice coil motor array module has the following disadvantages:

1) Since each voice coil motor has the conventional structure and components, the distance between the voice coil motors is large, so that the lenses cannot be closely arranged, and the images shot by the lenses have large parallax. Hence, the quality of the fused image is poor.

2) Each voice coil motor has a plurality of the magnetic components, so that the magnetic components of adjacent voice coil motors are redundantly disposed, thereby leading to high costs. Further, the adjacent magnetic components can generate attractive or repulsive magnetic forces, so that it is difficult to control the assembly error.

3) Because of interaction of the magnetic components of the adjacent voice coil motors, the action force generated by the current and the magnetic field is affected, thereby leading to poor focus.

SUMMARY OF THE INVENTION

Therefore, an object of the present invention is to provide a voice coil motor array module that is capable of overcoming the aforesaid drawbacks of the prior art.

Accordingly, a voice coil motor array module comprises a carrier frame, a plurality of magnetic components and a plurality of displacement components. The carrier frame defines a plurality of receiving spaces arranged in an (M)×(N) matrix array on a plane, and a plurality of magnet-mounting spaces. M and N are positive integers. The magnet-mounting spaces are disposed in pairs and in symmetry around the receiving spaces. Any two adjacent ones of the receiving spaces have only one the magnet-mounting space therebetween. The magnetic components are respectively disposed in the magnet-mounting spaces. Each of the magnet-mounting spaces receives only one magnetic component. The magnetic components surrounding a corresponding one of the receiving spaces have same magnetic poles facing each other. The displacement components are respectively disposed in the receiving spaces. Each of the displacement components includes a lens carrier and a coil. When the coil of one of the displacement components is energized, the coil interacts with the magnetic components that surround a corresponding one of the receiving spaces to generate a force that displaces the lens carrier of the one of the displacement components along a normal direction of the plane.

The efficiency of this invention resides in that by using the carrier frame to integrate the magnet-mounting spaces that receive all the magnetic components, a distance between adjacent voice coil motors can be closer, and the adjacent displacement components can share the same magnetic component, so that the number of the magnetic components can be reduced and the costs can be minimized.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Before the present invention is described in greater detail with reference to the accompanying embodiments, it should be noted herein that like elements are denoted by the same reference numerals throughout the disclosure.

Figure 1:
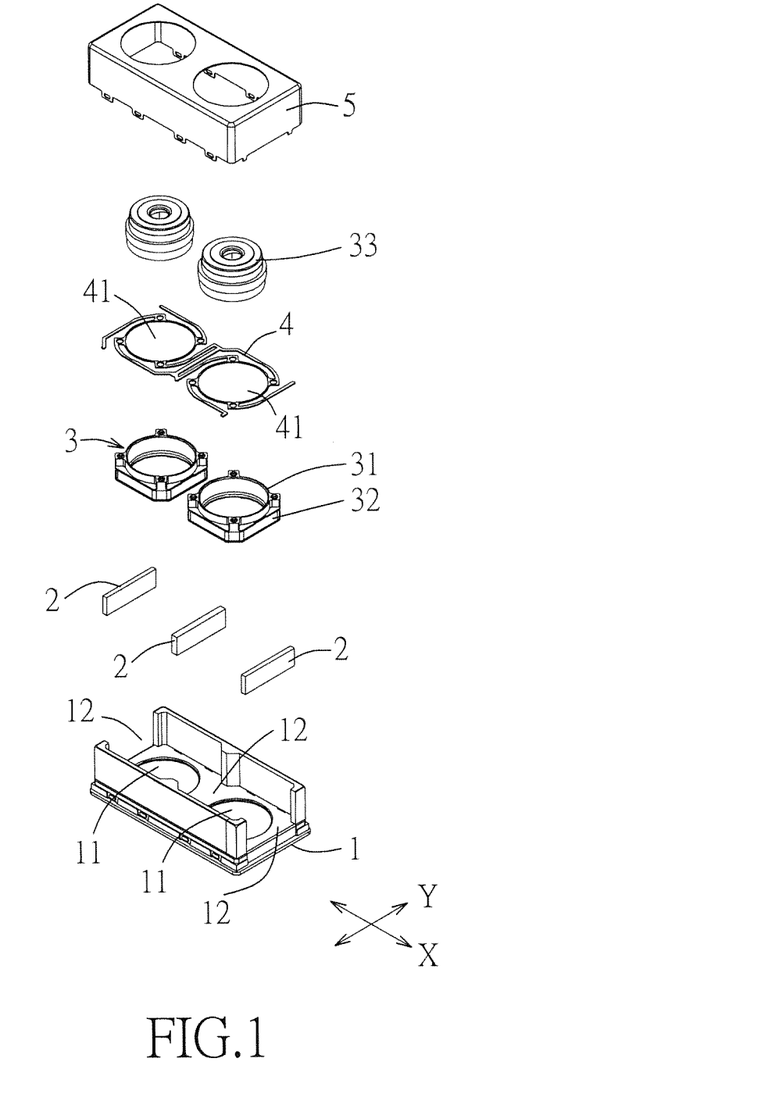
FIG. 1 is an exploded perspective view of the first embodiment of a voice coil motor array module according to the present invention.
Figure 2:
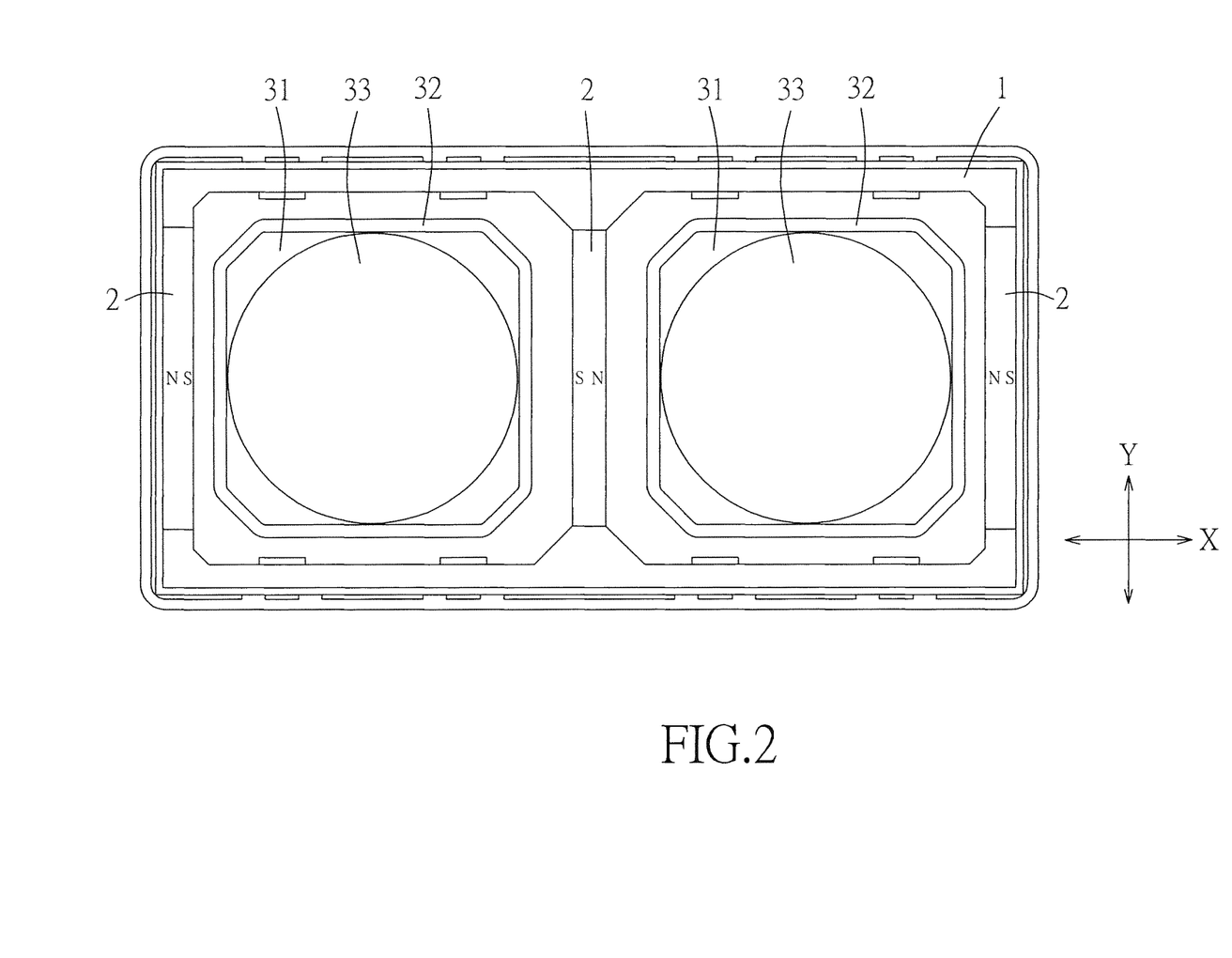
FIG. 2 is a schematic top view of the first embodiment in an assembled state, but with a cover and an elastic member being removed for clarity's sake.

Referring to FIGS. 1 and 2, a voice coil motor array module according to the first embodiment of the present invention is shown to comprise a carrier frame 1, a plurality of magnetic components 2, a plurality of displacement components 3, at least one elastic member 4 and a cover 5. The voice coil motor array module is used for driving a plurality of lenses 33 to displace so that a clear image may be captured.

The carrier frame 1 defines a plurality of receiving spaces 11 arranged in an (M)×(N) matrix array on a plane, and a plurality of magnet-mounting spaces 12. (M) and (N) are positive integers. The magnet-mounting spaces 12 are disposed in pairs and in symmetry around the receiving spaces 11. Any two adjacent ones of the receiving spaces 11 have only one magnet-mounting space 12 therebetween.

In this embodiment, M=1 and N>1, and the receiving spaces 11 are linearly arranged on the plane along a first direction (X). Further, each receiving space 11 is surrounded by two magnet-mounting spaces 12. For convenience of illustration, the number of the receiving spaces 11 is two, the number of the magnet-mounting spaces 12 is three, the number of the magnetic components 2 is three, and the number of the displacement components 3 is two.

The magnetic components 2 are respectively disposed in the magnet-mounting spaces 12. The magnetic components 2 disposed on the magnet-mounting spaces 12 that surround a corresponding one of the receiving spaces 11 have same magnetic poles facing each other. FIG. 2 is a sectional top view of this embodiment, but without the elastic member 4 and the cover 5. The "S" and "N" in the drawing respectively represent the south and north magnetic poles of each magnetic component 2. As shown in FIG. 2, there is only one magnet-mounting space 12 between two adjacent receiving spaces 11, and only one magnetic component 2 is disposed in the magnet-mounting space 12. A connecting direction of the magnetic poles of each magnetic component 2 in the magnet-mounting spaces 12 is parallel to the first direction (X). In this embodiment, each magnetic component 2 has a rectangular body.

The displacement components 3 are respectively disposed in the receiving spaces 11. Each displacement component 3 includes a lens carrier 31 for carrying a lens 33, and a coil 32 wound around the lens carrier 31. An axial direction of the coil 32 is parallel to a normal direction of the plane. When the coil 32 of one of the displacement components 3 is energized, the coil 32 interacts with the magnetic fields of the magnetic components 2 that surround the corresponding receiving space 11 to generate a Lorentz force that displaces the lens carrier 31 of the one of the displacement components 3 along the normal direction of the plane.

The elastic member 4 is substantially parallel to the plane, and has a portion fixed to the carrier frame 1, and another portion fixed to top sides of the lens carriers 31 of the displacement components 3. The elastic member 4 has a plurality of through holes 41 corresponding in position to the receiving spaces 11. When the lens carrier 31 of each displacement component 3 displaces in the presence of the Lorentz force, the elastic member 4 deforms and generates a resilient force that balances the Lorentz force. Furthermore, light can enter the lens 33 carried by the lens carrier 31 through the through holes 41 to produce a clear image.

In this embodiment, the voice coil motor array module comprises only one elastic member 4. In an alternative embodiment, the voice coil motor array module may include two elastic members 4, and is not limited to the aforesaid disclosure.

The cover 5 is disposed on top of the carrier frame 1 to protect the magnetic components 2 and the displacement components 3 disposed therein. It should be noted that, in an alternative embodiment, the cover 5 may be a part of the carrier frame 1. That is, the cover 5 and the carrier frame 1 may be integrally formed as one component.

It is particularly worth mentioning that, as shown in FIG. 2, the magnetic polarities between two adjacent displacement components 3 are opposite. To displace the two adjacent displacement components 3 along the same normal direction of the plane, assuming that the coils 32 have the same winding direction, for example, a clockwise direction as viewed from FIG. 2, then the direction of current from a control unit (not shown) to the coils 32 of the displacement components 3 must be opposite. Or, assuming that the winding directions of the coils 32 of the two adjacent displacement components 3 are opposite, that is, one is clockwise and the other is counterclockwise, then the direction of current from the control unit to the coils 32 of the displacement components 3 may be the same. As such, the displacement direction of each displacement component 3 may be controlled consistently and conveniently. Moreover, because the coil 3 of each displacement component 3 is energized or not and the magnitude of the energizing current can be separately controlled by the control unit, each lens 33 can be operated independently.

Figure 3:
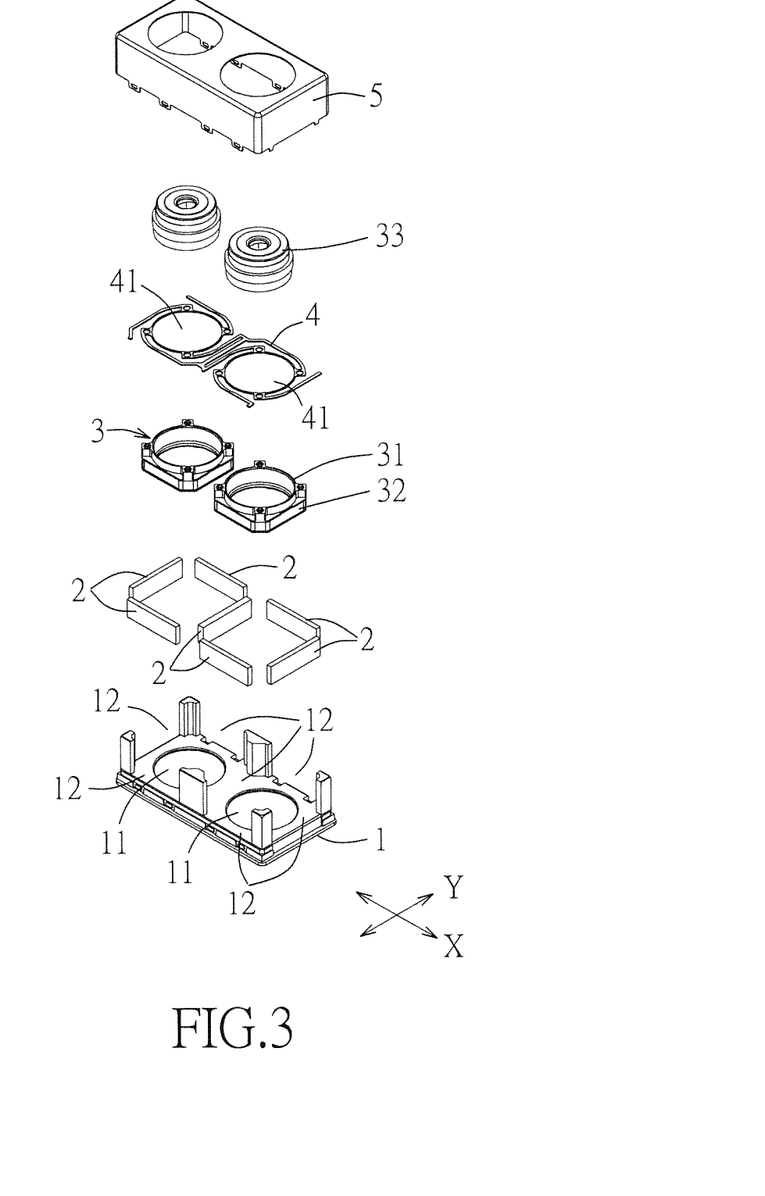
FIG. 3 an exploded perspective view of the second embodiment of a voice coil motor array module according to the present invention.
Figure 4:
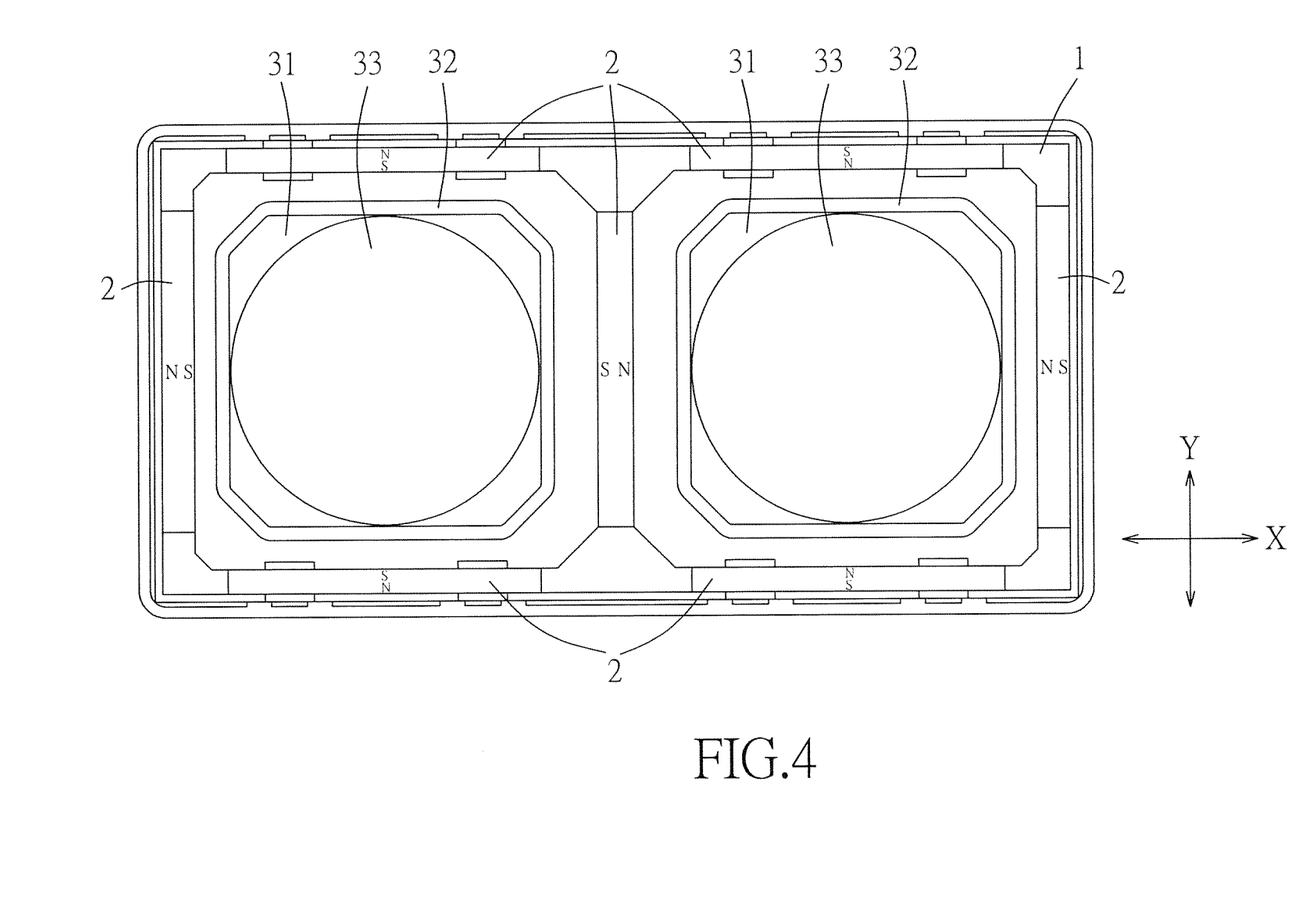
FIG. 4 is a schematic top view of the second embodiment in an assembled state, but with a cover and an elastic member being removed for clarity's sake.

Referring to FIGS. 3 and 4, a voice coil motor array module according to the second embodiment of the present invention is shown to be substantially identical to the first embodiment. The difference between the first and second embodiments resides in that each receiving space 11 is surrounded by four magnet-mounting spaces 12. Further, a connecting direction of two magnetic poles of each of most of the magnetic components 2 is parallel to the first direction (X), while a connecting direction of two magnetic poles of each of the remaining number of the magnetic components 2 is perpendicular to the first direction (X). The elastic member 4 and the cover 5 are not illustrated in FIG. 4.

For convenience of illustration, it is exemplified herein that N=2, the number of the receiving spaces 11 is two, the number of the magnet-mounting spaces 12 is seven, the number of the magnetic components 2 is seven, and the number of the displacement components 3 is two.

As shown in FIG. 4, the four magnets 2 surrounding each displacement component 3 are symmetrically arranged. Further, a connecting direction of the magnetic poles of each of two of the magnetic components 2 is parallel to the first direction (X), while a connecting direction of the magnetic poles of each of the other two of the magnetic components 2 is perpendicular to the first direction (X).

Figure 5:
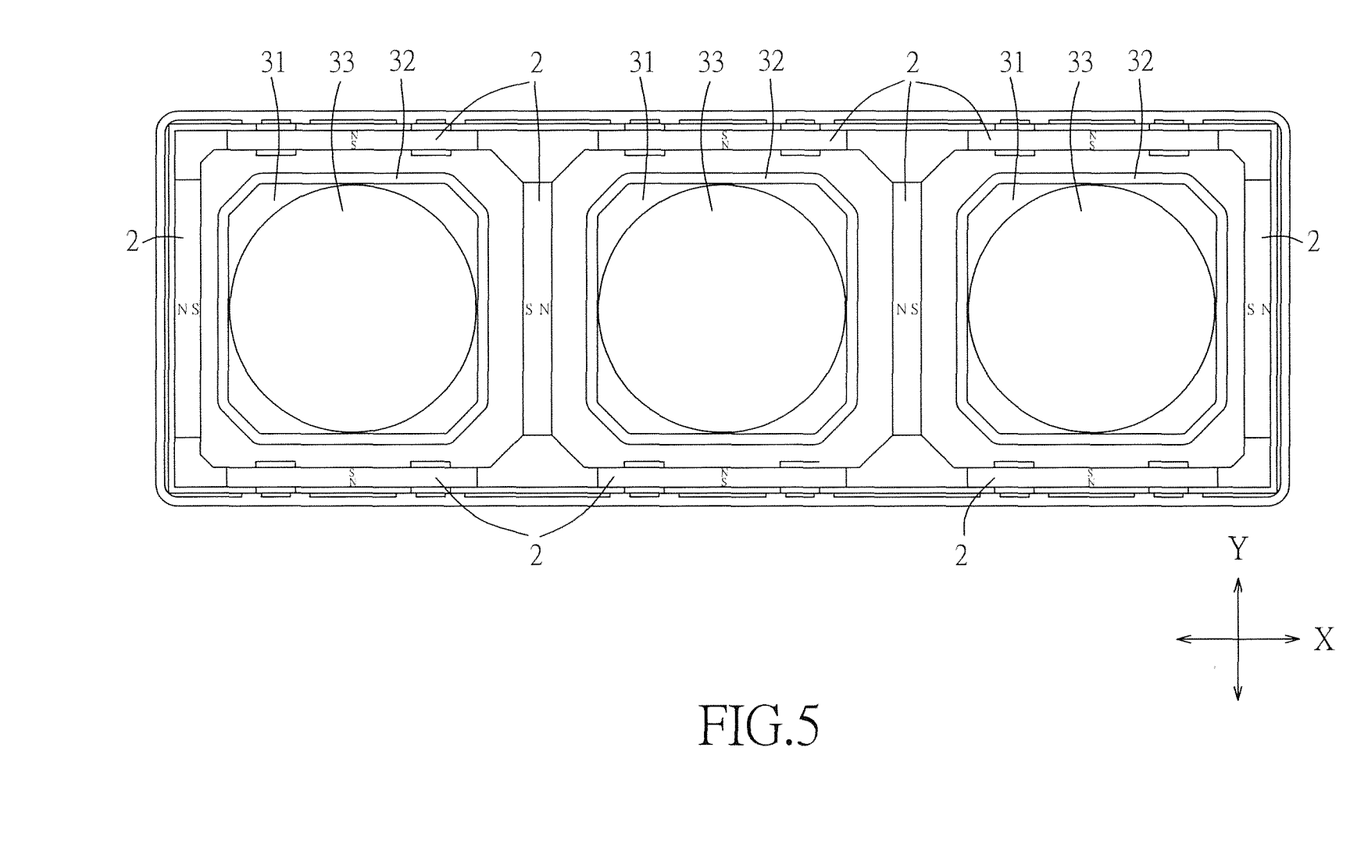
FIG. 5 is a schematic top view of an alternative form of the second embodiment.

An alternative form of the second embodiment is shown in FIG. 5. In this case, N=3, and the magnetic polarities that surround one of the receiving spaces 11 are opposite to the magnetic polarities that surround an adjacent one of the receiving spaces 11. The elastic member 4 and the cover 5 are not illustrated in FIG. 5.

Figure 6:
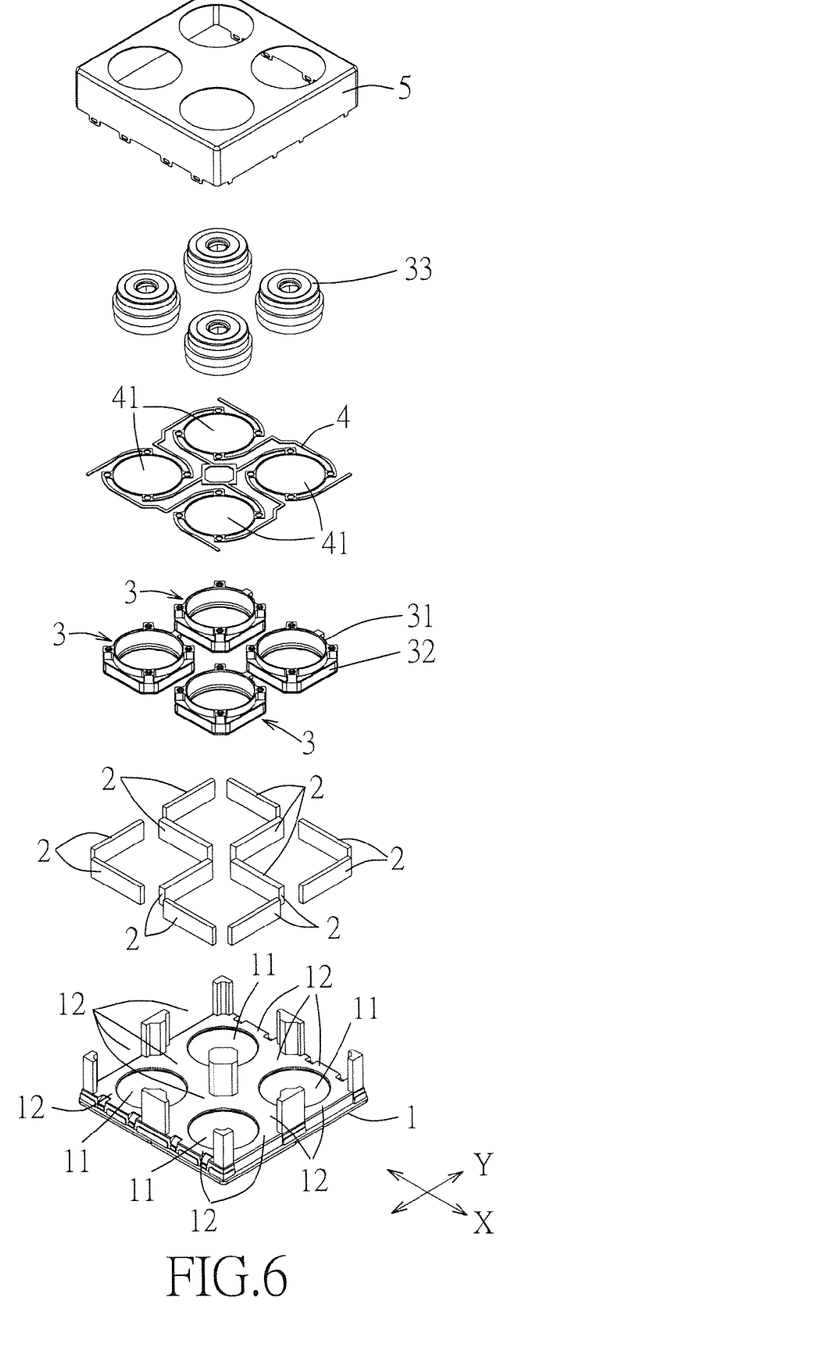
FIG. 6 is an exploded perspective view of the third embodiment of a voice coil motor array module according to the present invention.
Figure 7:
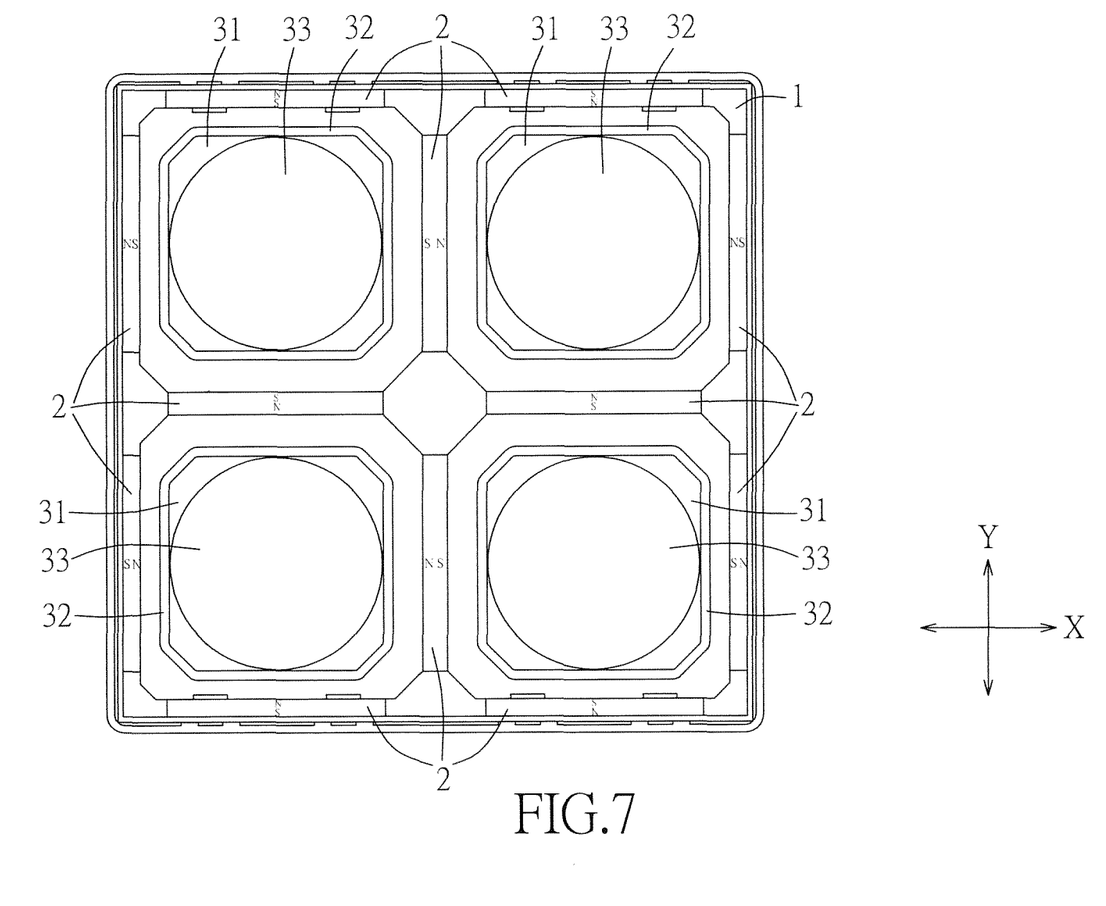
FIG. 7 is a schematic top view of the third embodiment in an assembled state, but with a cover and an elastic member being removed for clarity's sake.

Referring to FIGS. 6 and 7, a voice coil motor array module according to the third embodiment of the present invention is shown to be substantially identical to the first embodiment. The difference between the first and third embodiments resides in that M>1 and N>1, and each receiving space 11 is surrounded by four magnet-mounting spaces 12. The receiving spaces 11 are arranged on the plane along the first direction (X) and a second direction (Y) transverse to the first direction (X). Further, a connecting direction of two magnetic poles of each of most of the magnetic components 2 is parallel to the first direction (X), while a connecting direction of two magnetic poles of each of the remaining number of the magnetic components 2 is parallel to the second direction (Y). The elastic member 4 and the cover 5 are not illustrated in FIG. 7.

For convenience of illustration, it is exemplified herein that M=N=2, the number of the receiving spaces 11 is four, the number of the magnet-mounting spaces 12 is twelve, the number of the magnetic components 2 is twelve, and the number of the displacement components 3 is four.

As shown in FIG. 7, the four magnets 2 surrounding each displacement component 3 are symmetrically arranged. Further, a connecting direction of the magnetic poles of each of two of the magnetic components 2 is parallel to the first direction (X), while a connecting direction of the magnetic poles of each of the other two of the magnetic components 2 is parallel to the second direction (Y).

Figure 8:
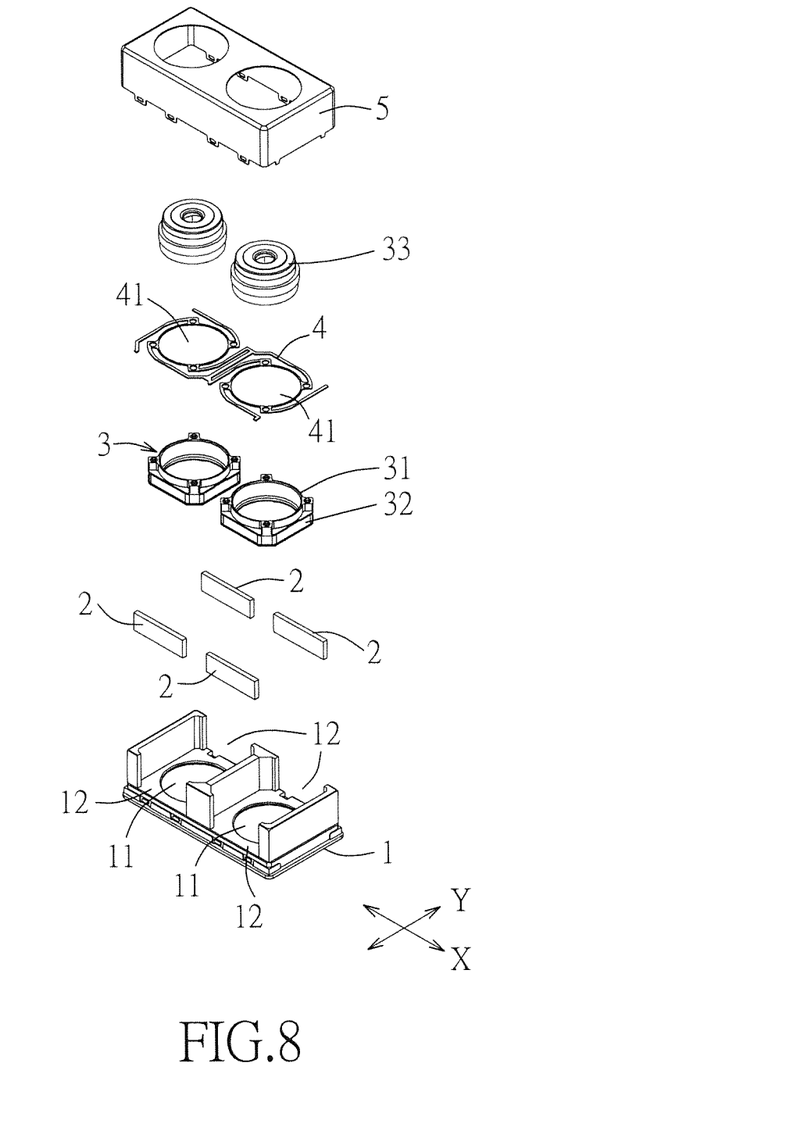
FIG. 8 is an exploded perspective view of the fourth embodiment of a voice coil motor array module according to the present invention.
Figure 9:
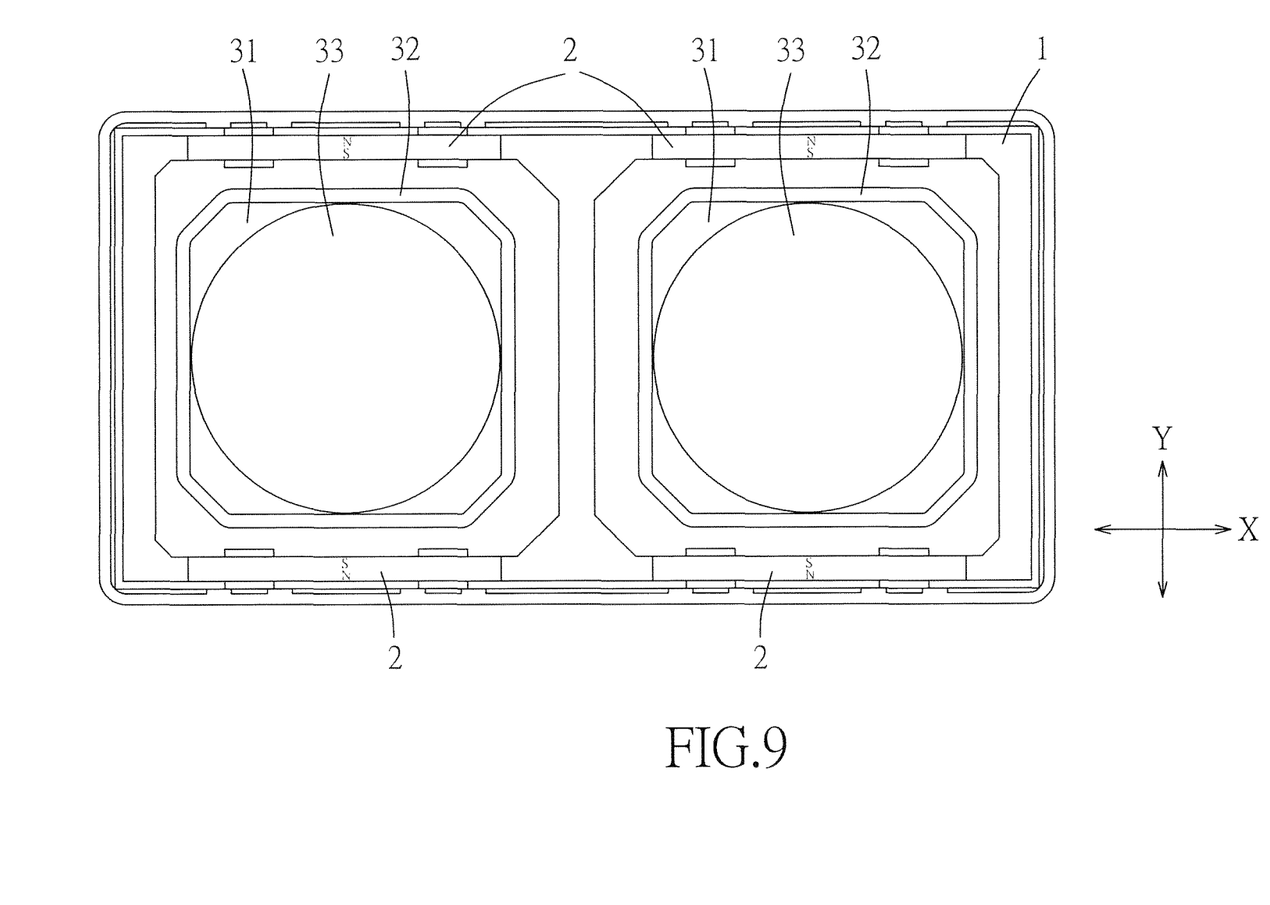
FIG. 9 is a schematic top view of the fourth embodiment in an assembled state, but with a cover and an elastic member being removed for clarity's sake.

Referring to FIGS. 8 and 9, a voice coil motor array module according to the fourth embodiment of the present invention is shown to be substantially identical to the first embodiment. Particularly, the voice coil motor array module of this embodiment comprises a carrier frame 1, a plurality of magnetic components 2, a plurality of displacement components 3, an elastic member 4 and a cover 5. The voice coil motor array module is used for driving a plurality of lenses 33 to displace so that a clear image may be captured.

The carrier frame 1 defines a plurality of receiving spaces 11 arranged on a plane along the first direction (X), and a plurality of magnet-mounting spaces 12. The magnet-mounting spaces 12 are disposed in pairs and in symmetry around the receiving spaces 11.

In this embodiment, each receiving space 11 is surrounded by two magnet-mounting spaces 12. For convenience of illustration, the number of the receiving spaces 11 is two, the number of the magnet-mounting spaces 12 is four, the number of the magnetic components 2 is four, and the number of the displacement components 3 is two.

The magnetic components 2 are respectively disposed in the magnet-mounting spaces 12. The magnetic components 2 disposed on the magnet-mounting spaces 12 that surround a corresponding one of the receiving spaces 11 have same magnetic poles facing each other. A connecting direction of the magnetic poles of each magnetic component 2 is perpendicular to the first direction (X). The elastic member 4 and the cover 5 are not illustrated in FIG. 9.

The displacement components 3 are respectively disposed in the receiving spaces 11. Each displacement component 3 includes a lens carrier 31 for carrying a lens 33, and a coil 32 wound around the lens carrier 31. An axial direction of the coil 32 is parallel to a normal direction of the plane. When the coil 32 of one of the displacement components 3 is energized, the coil 32 interacts with the magnetic fields of the magnetic components 2 that surround the corresponding receiving space 11 to generate a Lorentz force that displaces the lens carrier 31 of the one of the displacement components 3 along the normal direction of the plane.

The elastic member 4 is substantially parallel to the plane, and has a portion fixed to the carrier frame 1, and another portion fixed to top sides of the lens carriers 31 of the displacement components 3. The elastic member 4 has a plurality of through holes 41 corresponding in position to the receiving spaces 11. When the lens carrier 31 of each displacement component 3 displaces in the presence of the Lorentz force, the elastic member 4 deforms and generates a resilient force that balances the Lorentz force. Furthermore, light can enter the lens 33 carried by the lens carrier 31 through the through holes 41 to produce a clear image.

In this embodiment, the voice coil motor array module only includes one elastic member 4. In an alternative embodiment, the voice coil motor array module may include two elastic members 4.

The cover 5 is disposed on top of the carrier frame 1 to protect the magnetic components 2 and the displacement components 3 disposed therein.

The advantages of this invention can be summarized as follows:

1. Each displacement component 3 is mounted in a respective one of the receiving spaces 11 of the carrier frame 1, so that the displacement components 3 can be compactly arranged, thereby shortening the distance between the lenses 33. Hence, the images shot by the lenses 33 can have smaller parallax, and a good fused image can be obtained.

2. Two adjacent ones of the displacement components 3 can share a common magnetic component 2, so that the number of the magnetic components 2 can be effectively reduced. Hence, the cost can be minimized.

3. The magnetic components 2 are symmetrically distributed on a periphery of each displacement component 3, so that the magnetic field around each displacement component 3 is uniformly distributed and each coil 32 can interact with the magnetic field to generate a uniform Lorentz force.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A voice coil motor array module comprising:
a carrier frame defining a plurality of receiving spaces arranged in an (M)×(N) matrix array on a plane, and a plurality of magnet-mounting spaces, M and N being positive integers, said magnet-mounting spaces being disposed in pairs and in symmetry around said receiving spaces;
a plurality of magnetic components respectively disposed in said magnet-mounting spaces, each of said magnet-mounting spaces receiving only one said magnetic component, said magnetic components surrounding a corresponding one of said receiving spaces having same magnetic poles facing each other; and
a plurality of displacement components respectively disposed in said receiving spaces, each of said displacement components including a lens carrier and a coil;
wherein, any two adjacent ones of said receiving spaces have only one said magnet-mounting space therebetween for receiving a shared magnetic component; and
wherein, when said coil of one of said displacement components is energized, said coil interacts with said magnetic components that surround a corresponding one of said receiving spaces to generate a force that displaces said lens carrier of said one of said displacement components along a normal direction of the plane.

2. The voice coil motor array module as claimed in claim 1, further comprising at least one elastic member that is substantially parallel to the plane and that is disposed in said carrier frame, said elastic member being deformed when said displacement components are displaced to generate a resilient force that balances the displacement force, said elastic member having a plurality of through holes corresponding in position to said receiving spaces.

3. The voice coil motor array module as claimed in claim 1, wherein, when M=1 and N>1, said receiving spaces are linearly arranged on the plane along a first direction.

4. The voice coil motor array module as claimed in claim 3, wherein each of said receiving spaces is surrounded by two said magnet-mounting spaces, and a connecting direction of two magnetic poles of each of said magnetic components is parallel to the first direction.

5. The voice coil motor array module as claimed in claim 4, wherein said coil is wound around said lens carrier, and any two said coils located on two adjacent ones of said receiving spaces have opposite winding directions.

6. The voice coil motor array module as claimed in claim 3, wherein each of said receiving spaces is surrounded by four said magnet-mounting spaces, a connecting direction of two magnetic poles of each of most of said magnetic components being parallel to the first direction, a connecting direction of two magnetic poles of each of the remaining number of said magnetic components being perpendicular to the first direction.

7. The voice coil motor array module as claimed in claim 6, wherein said coil is wound around said lens carrier, and any two said coils located on two adjacent ones of said receiving spaces have opposite winding directions.

8. The voice coil motor array module as claimed in claim 1, wherein, when M>1 and N>1, said receiving spaces are arranged on the plane along a first direction and a second direction transverse to the first direction, each of said receiving spaces being surrounded by four said magnet-mounting spaces, a connecting direction of two magnetic poles of each of a predetermined portion of said magnetic components being parallel to the first direction, a connecting direction of two magnetic poles of each of a remaining portion of said magnetic components being parallel to the second direction.

9. The voice coil motor array module as claimed in claim 8, wherein said coil is wound around said lens carrier, and any two said coils located on two adjacent ones of said receiving spaces have opposite winding directions.

10. A voice coil motor array module comprising:
a carrier frame defining a plurality of receiving spaces arranged on a plane in mutual alignment along a first direction, and a plurality of magnet-mounting spaces, said magnet-mounting spaces being disposed in pairs and in symmetry around said receiving spaces;
a plurality of magnetic components respectively disposed in said magnet-mounting spaces, each of said magnet-mounting spaces receiving only one said magnetic component, said magnetic components surrounding a corresponding one of said receiving spaces opposing one another transversely across the first direction and mutually oriented with magnetic poles of the same polarity facing each other transversely across the first direction, a connecting direction of two magnetic poles of each of said magnetic components being perpendicular to the first direction, the mutually aligned receiving spaces being thereby arranged along the first direction uninterrupted by any magnetic component interposed therebetween; and
a plurality of displacement components respectively disposed in said receiving spaces, each of said displacement components including a lens carrier and a coil;
wherein, when said coil of one of said displacement components is energized, said coil interacts with said magnetic components that surround a corresponding one of said receiving spaces to generate a force that displaces said lens carrier of said one of said displacement components along a normal direction of the plane.

11. The voice coil motor array module as claimed in claim 10, further comprising at least one elastic member that is substantially parallel to the plane and that is disposed in said carrier frame, said elastic member being deformed when said displacement components are displaced to generate a resilient force that balances the displacement force, said elastic member having a plurality of through holes corresponding in position to said receiving spaces.

* * * * *